United States Patent
Wang (10) Patent No.: US 8,924,642 B2
(45) Date of Patent: Dec. 30, 2014

(54) MONITORING RECORD MANAGEMENT METHOD AND DEVICE

(71) Applicant: Huawei Technologies Co., Ltd., Shenzhen (CN)

(72) Inventor: Chen Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/140,151

(22) Filed: Dec. 24, 2013

(65) Prior Publication Data

US 2014/0181332 A1 Jun. 26, 2014

Related U.S. Application Data

(63) Continuation of application No. PCT/CN2012/087170, filed on Dec. 21, 2012.

(51) Int. Cl.
| | |
|---|---|
| G06F 12/00 | (2006.01) |
| G06F 13/00 | (2006.01) |
| G06F 13/28 | (2006.01) |
| G06F 7/00 | (2006.01) |
| G06F 17/00 | (2006.01) |
| G06F 17/30 | (2006.01) |
| G06F 11/30 | (2006.01) |

(52) U.S. Cl.
CPC .................. *G06F 11/3037* (2013.01)
USPC ........... 711/112; 711/156; 707/616; 707/736; 707/737

(58) Field of Classification Search
None
See application file for complete search history.

(56) References Cited

U.S. PATENT DOCUMENTS

| | | | | |
|---|---|---|---|---|
| 7,506,101 | B2 * | 3/2009 | Liu et al. | 711/114 |
| 8,281,100 | B2 * | 10/2012 | Yoshinari et al. | 711/165 |
| 2002/0129048 | A1 | 9/2002 | Qiu et al. | |
| 2006/0004847 | A1 * | 1/2006 | Claudatos et al. | 707/103 R |
| 2006/0184565 | A1 * | 8/2006 | Nishikawa et al. | 707/102 |
| 2008/0250057 | A1 * | 10/2008 | Rothstein et al. | 707/102 |
| 2011/0099268 | A1 | 4/2011 | Ozaki et al. | |
| 2011/0144951 | A1 | 6/2011 | Lieberman et al. | |
| 2011/0197046 | A1 | 8/2011 | Chiu et al. | |
| 2012/0131196 | A1 | 5/2012 | Yamada | |
| 2014/0122774 | A1 * | 5/2014 | Xian et al. | 711/103 |

OTHER PUBLICATIONS

International Search Report and Written Opinion received in Application No. PCT/CN2012/087170 mailed Sep. 26, 2013, 11 pages.

* cited by examiner

*Primary Examiner* — Jared Rutz
*Assistant Examiner* — Marwan Ayash
(74) *Attorney, Agent, or Firm* — Huawei Technologies Co., Ltd.

(57) ABSTRACT

The present invention provides a monitoring record management technology, which is used to manage a monitoring record stored in a memory, where the monitoring record is used to monitor a chunk in a storage, and by reading at least one monitoring parameter from each monitoring record in the memory, monitoring records between which a monitoring parameter meets a threshold are combined or split. After the monitoring record management technology provided in the present invention is applied, the occupancy of the memory can be reduced or the accuracy of the monitoring record can be improved.

18 Claims, 5 Drawing Sheets

MONITORING RECORD MANAGEMENT METHOD AND DEVICE

This application is a continuation of International Application No. PCT/CN2012/087170, filed on Dec. 21, 2012, which is hereby incorporated by reference in its entirety.

TECHNICAL FIELD

The present invention relates to the field of storage, and in particular to, a monitoring record management technology.

BACKGROUND

Data in a storage system has a life cycle characteristic. For example, a network video produced recently is watched by many people and has a large access amount, so that in a video server, the video is hot spot data; as time goes on, after several months, the video is not focused by people, and the access amount of the video sharply decreases, so that in the video server, the video is data with general popularity; and after several years, the video is rarely watched by people and is also rarely accessed by people, so that in the video server, the video is cold spot data.

Different management may be performed on data at different stages of a life cycle. For example, tiered storage may be performed on data, hot spot data is migrated into a tier of high performance in the storage system, where an input speed is fast in the tier of high performance, so as to improve an input speed of the data; and cold spot data is migrated into a tier of poor performance, where an input speed is slow in the tier of poor performance, so as to meet a performance and capacity requirement of the storage system at a low price.

A chunk is a basic storage unit in the storage system, and data is stored in the chunk. A monitoring parameter of each chunk, such as an access frequency and an IO size, is monitored, then data obtained through monitoring is stored in a storage medium (such as a memory), and by analyzing monitoring data, monitoring of a life cycle of data in a chunk may be implemented. However, the number of monitoring records is decided by the total number of chunks, so that it is often difficult to meet an actual requirement of a user, for example, after a great mass of chunks are stored in the storage system, a large number of monitoring records bring a huge challenge to the capacity of the storage medium.

SUMMARY OF THE INVENTION

The present invention provides a monitoring record management method and device, so that a monitoring granularity of a monitoring record may be changed.

In a first aspect, an embodiment of the present invention provides a monitoring record management method, where multiple monitoring records are stored in a memory, each monitoring record is used to monitor one chunk in a storage, and one monitoring record is a set of monitoring parameters of one chunk, where the monitoring parameter includes, for example, input/output operations per second IOPS of a monitored chunk, and the method includes: reading at least one monitoring parameter from each monitoring record in the memory; reading, from the memory, monitoring records between which one or more monitoring parameter differences meet a preset threshold, combining the read monitoring records and generating a combined monitoring record, wherein identities of monitored chunks are recorded in the combined monitoring record, and deleting the read monitoring records from the memory, where a value of each monitoring parameter in the combined monitoring record is equal to a value of each monitoring parameter when monitored chunks are viewed as one chunk; and writing the combined monitoring record into the memory, where the combined monitoring record is used to monitor chunks monitored by each monitoring record before the combination.

In a first possible implementation manner of the first aspect, after the writing the combined monitoring record into the memory, the method further includes: monitoring an I/O request for a chunk in the storage; and using an I/O request record of the chunk monitored by the combined monitoring record to update each monitoring parameter of the combined monitoring record in the memory.

In combination with the first aspect, the first possible implementation manner of the first aspect, or a second possible implementation manner of the first aspect, in a third possible implementation manner of the first aspect, the reading, from the memory, monitoring records between which one or more monitoring parameter differences meet a preset threshold specifically is: reading monitoring records between which IOPS meets a preset threshold of the IOPS and the number of IO times meets a preset threshold of the number of IO times.

In combination with the first aspect, the first possible implementation manner of the first aspect, or the second possible implementation manner of the first aspect, or the third possible implementation manner of the first aspect, in a fourth possible implementation manner of the first aspect, after the writing the combined monitoring record into the memory, the method further includes: reading the combined monitoring record from the memory, splitting the combined monitoring record into at least one split monitoring record, where each split monitoring record is used to monitor at least one chunk, and in the split monitoring record, a sum of values of monitoring parameters is equal to a value of a monitoring parameter in the combined monitoring record; and deleting the read combined monitoring record from the memory, and writing each split monitoring record into the memory.

In a second aspect, an embodiment of the present invention provides a monitoring record splitting method, where multiple monitoring records are stored in a memory, and each monitoring record is used to monitor at least one chunk in a storage, and each monitoring record is a set of monitoring parameters of a monitored chunk, where the monitoring parameter includes, for example, input/out operations per second IOPS of the monitored chunk, and the method includes: reading at least one monitoring parameter from each monitoring record in the memory; and splitting a monitoring record of which each value of the monitoring parameter meets a preset threshold, and generating at least two monitoring records after the splitting, wherein an offset address and a data length of data are carried in each split monitoring record, a sum of values of monitoring parameters in the split monitoring record is equal to a value of a monitoring parameter of the same type in a combined monitoring record; and writing the split monitoring records into the memory, wherein the split monitoring records are used to monitor data described by the offset address and the data length that are carried in the split monitoring record.

In a first possible implementation manner of the second aspect, a value of each monitoring parameter in each split monitoring record specifically is a value obtained by apportioning a value of each monitoring parameter in the monitoring record before the splitting into each split monitoring record according to a data length carried in each split monitoring record.

In a fifth aspect, an embodiment of the present invention provides a storage controller, where the storage controller includes a CPU, a communication interface communicating with the CPU, and a memory communicating with the CPU, where the communication interface is configured to communicate with a storage; the memory is configured to store multiple monitoring records, wherein each monitoring record is used to monitor one chunk in the storage, and one monitoring record is a set of monitoring parameters of one chunk; and the CPU is configured to perform a program, wherein the program is used to: read, from monitoring records in the memory, at least one monitoring parameter; for the read monitoring parameter, calculate a difference of monitoring parameters of the same type between different monitoring records; read, from the memory, monitoring records between which each monitoring parameter difference meets a corresponding preset threshold, combining the read monitoring records and generating a combined monitoring record, wherein identities of monitored chunks are recorded in the combined monitoring record, and deleting, from the memory, the monitoring records that are combined, wherein a value of at least one monitoring parameter in the combined monitoring record is equal to a value of each monitoring parameter when all monitored chunks are viewed as one chunk; and write the combined monitoring record into the memory, wherein the combined monitoring record is used to monitor chunks monitored by each monitoring record before the combination.

In a sixth aspect, an embodiment of the present invention provides a storage controller, where the storage controller includes a CPU, a communication interface communicating with the CPU, and a memory communicating with the CPU, wherein the communication interface is configured to communicate with a storage; the memory is configured to store multiple monitoring records, wherein each monitoring record is used to monitor at least one chunk in the storage, and each monitoring record is a set of monitoring parameters of a monitored chunk; and the CPU is configured to perform a program, wherein the program is used to: read at least one monitoring parameter from each monitoring record in the memory; split a monitoring record of which each value of the monitoring parameter meets a preset threshold, and generating at least two monitoring records after the splitting, wherein an offset address and a data length of data are carried in each split monitoring record, a sum of values of monitoring parameters in the split monitoring record is equal to a value of a monitoring parameter of the same type in a combined monitoring record; and write the split monitoring records into the memory, wherein the split monitoring records are used to monitor data described by the offset address and the data length that are carried in the split monitoring record.

After the embodiments of the present invention are applied, a monitoring record may be split or combined, that is to say, a monitoring granularity of the monitoring record may be changed.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

A storage system is a system used to provide a data storage service, and may be formed by a storage controller and a storage that are physically and relatively independent, and may also be a server that has a storage function. A chunk (Chunk) is a basic logical storage unit in a storage, and is used to store data; and the chunk is a logically consecutive storage space in the storage, and each chunk maps to a physical storage medium, where these physical storage media may be non-consecutive. The chunk may have a fixed length or may have a variable length, and the size of its capacity may be only several K bytes or may also be several G bytes.

To identify information such as a cold-hot degree of stored data, the stored data needs to be monitored, a monitoring record is generated by using a chunk as a basic monitoring unit, and the monitoring record is formed by at least one monitoring parameter. Each monitoring parameter is used to monitor a dimension of an input/output situation of the chunk.

One monitoring record may be set for each chunk; these monitoring records need to be stored by using a storage medium. A monitoring record may be stored together with service data. To improve monitoring efficiency, an impact on input/output (Input/Output, I/O) of the service data is reduced as much as possible, where I/O may also be written as IO, and these monitoring records may also be stored separately from the service data, for example, may be stored in a memory in a storage system. The memory may adopt a random access memory (Random Access Memory, RAM), a solid state disk (Solid State Disk, SSD), or a flash (Flash), and if an input/output speed is not highly required, a storage medium such as a magnetic disk or a magnetic tape may also be used.

When an IO request is processed, if the length of the IO request exceeds the size of a chunk, the IO request is split according to the size of the chunk, and then is stored in different chunks. Correspondingly, in an embodiment of the present invention, when a monitoring record of each chunk is counted through an IO request, a split IO request is used as a counting basis. For example, if the length of an output IO request is 100 K, and a single chunk only has 30 K, the IO request may be split into four sub IO requests, and data is written into four chunks, where a monitoring record of each chunk monitors only a sub IO request that corresponds to the chunk. That is to say, in the embodiment of the present invention, in a case that the IO request is split, the term "IO request" refers to a split IO request.

Figure 1:
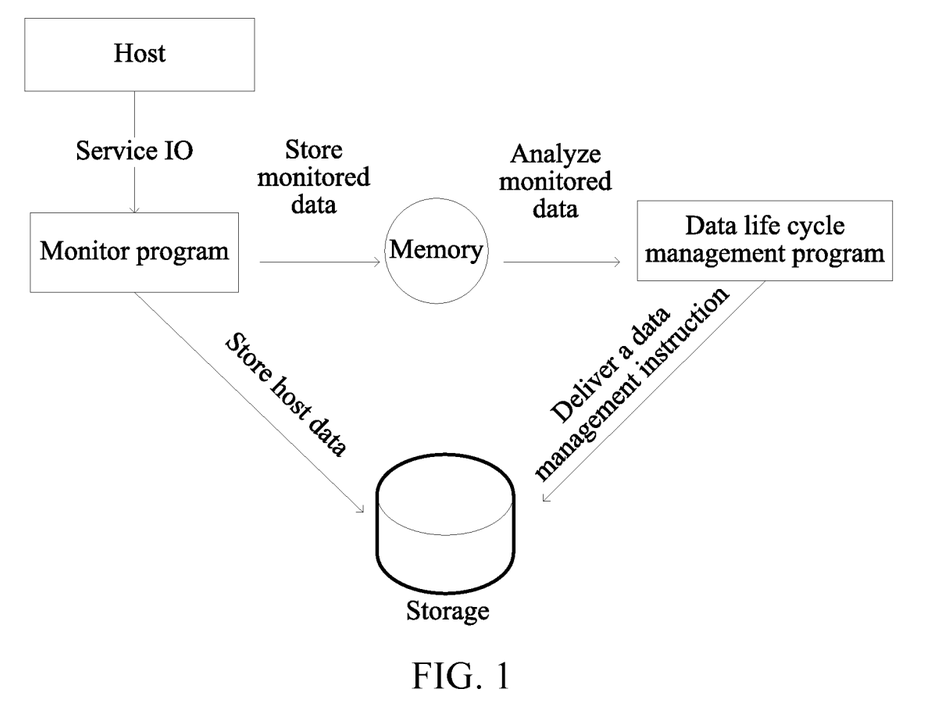
FIG. 1 is a topology diagram of applying Embodiment 1 of the present invention.

FIG. 1 is a topology diagram of applying Embodiment 1 of the present invention. When a host performs input/output access on a storage in a storage system, a monitoring program may monitor an IO request delivered by a service. Monitoring parameters such as IOPS and an IO delivery frequency of a chunk are obtained through monitoring, and then a monitoring record formed by the monitoring parameters is stored in a memory; and a data life cycle management program analyzes the monitoring record, and then manages the chunk in the storage by delivering a data management instruction to the storage, for example, migrates a chunk of which the IO is delivered frequently to an area where an input/output speed is faster in the storage. The memory in the figure is set in a controller of the storage system, and the monitoring program and the data life cycle management program are run in a CPU in the storage controller.

Each monitoring record includes several monitoring parameters, where a monitoring parameter records an input/output situation of a chunk, and the monitoring parameter may include one or more of the following: Input operations per second (Input Operations Per Second), output operations per second (Output Operations Per Second), and Input/Output operations per second (IOPS, Input/Output Operations Per Second) of a chunk. The monitoring parameter may further include one or more of the following: an input IO count (read IO count), an output IO (write IO count) count, and an input/output IO count (IO count). In addition, the monitoring parameter may further include: an input IO size (read IO size), where the input IO size refers to the size of data that one input IO requests for inputting, and the size of data that an IO request expects to input may be smaller than the size of a chunk, that is, only a part of data in one chunk is input; an output IO size (write IO size), where the output IO size refers to the size of data that an output IO requests for outputting, and the size of data that an IO request expects to output may be smaller than the size of a chunk, that is, only a part of one chunk is occupied; the number of input operations; the number of output operations; randomness, where the randomness refers to a proportion of the number of random IOs to the total number of IOs; an I/O frequency, where the I/O frequency refers to the number of IO requests in a unit time; and an I/O latency (IO latency) size (response time of a storage server to a host request).

When a great mass of chunks exist in a storage, a monitoring record needs to occupy a very large memory. In the embodiment of the present invention, one monitoring record may be used to monitor multiple chunks, so as to avoid a situation that a monitoring record cannot be created for a newly added chunk because a space of the memory is not enough. In another aspect, in the embodiment of the present invention, multiple monitoring records may also monitoring different ranges of the same chunk, so as to enhance the fineness of a monitoring result.

Embodiment 1

An embodiment of the present invention provides a monitoring record management method, which may be applied in a storage controller.

Multiple monitoring records are stored in a memory of a storage controller, and each monitoring record is used to monitor one chunk in a storage, one monitoring record is a set of monitoring parameters of one chunk, where the monitoring parameter includes, for example, input/out operations per second IOPS of a monitored chunk, an input/output frequency of the chunk, and input/output randomness of the chunk. A monitoring program monitors an input/output request of the chunk, and updates a monitoring record in the memory in real time by using a monitoring result. In a network storage technology (Network Storage Technologies, NAS) or a storage area network (Storage Area Network, SAN), a storage controller is physically independent relative to a storage, and in a storage server, the storage server itself has a storage controller, which is equivalent to that the storage controller is integrated in the storage server, and therefore, the method is performed by the storage server itself, and in a storage system of other forms, the method may be performed by a device that has a calculation capability similar to that of the storage controller. In the embodiment of the present invention, no matter whether it is physically independent, a storage controller that has a similar function is collectively called a storage controller.

Figure 2:
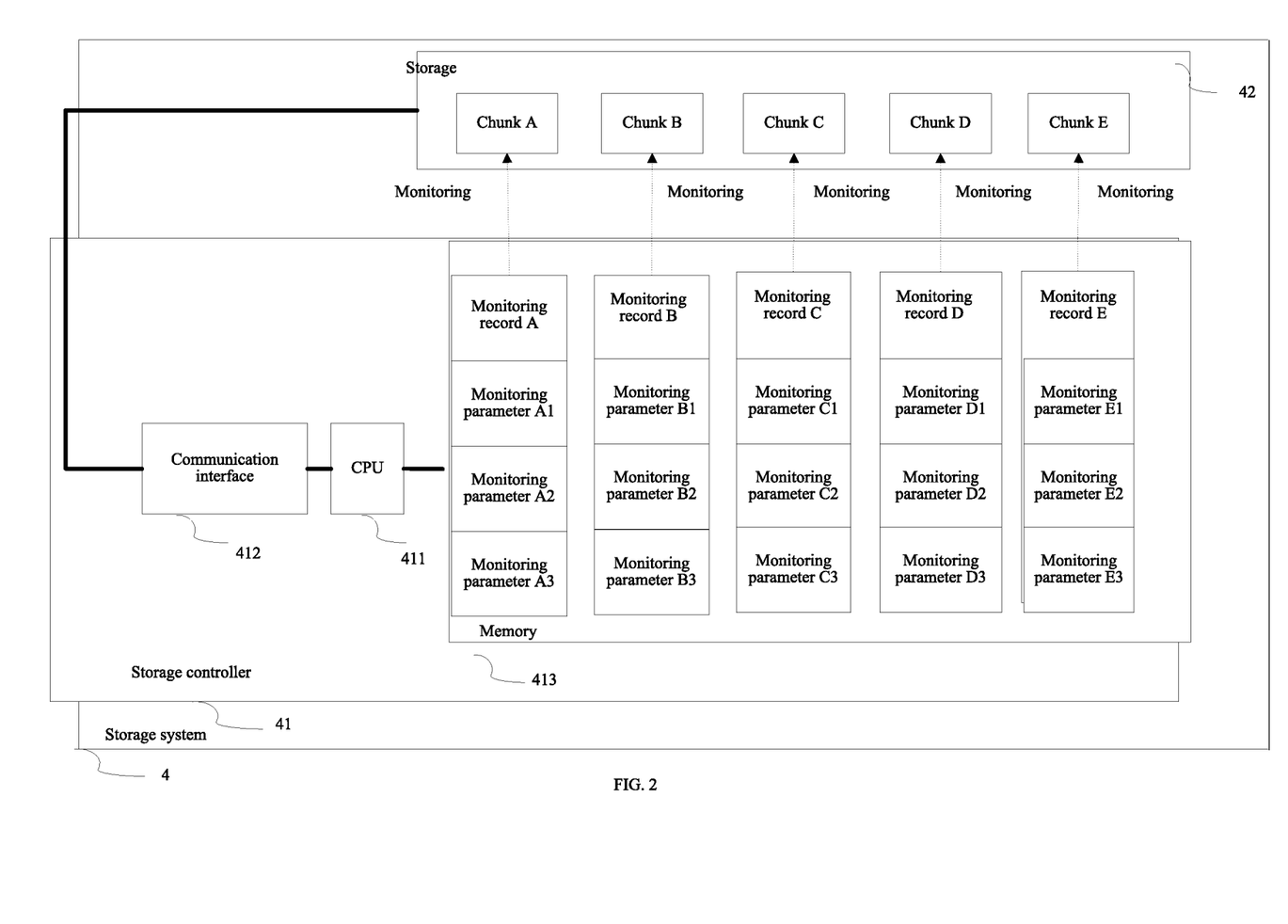
FIG. 2 is a structural diagram of an embodiment of the present invention.
Figure 3:
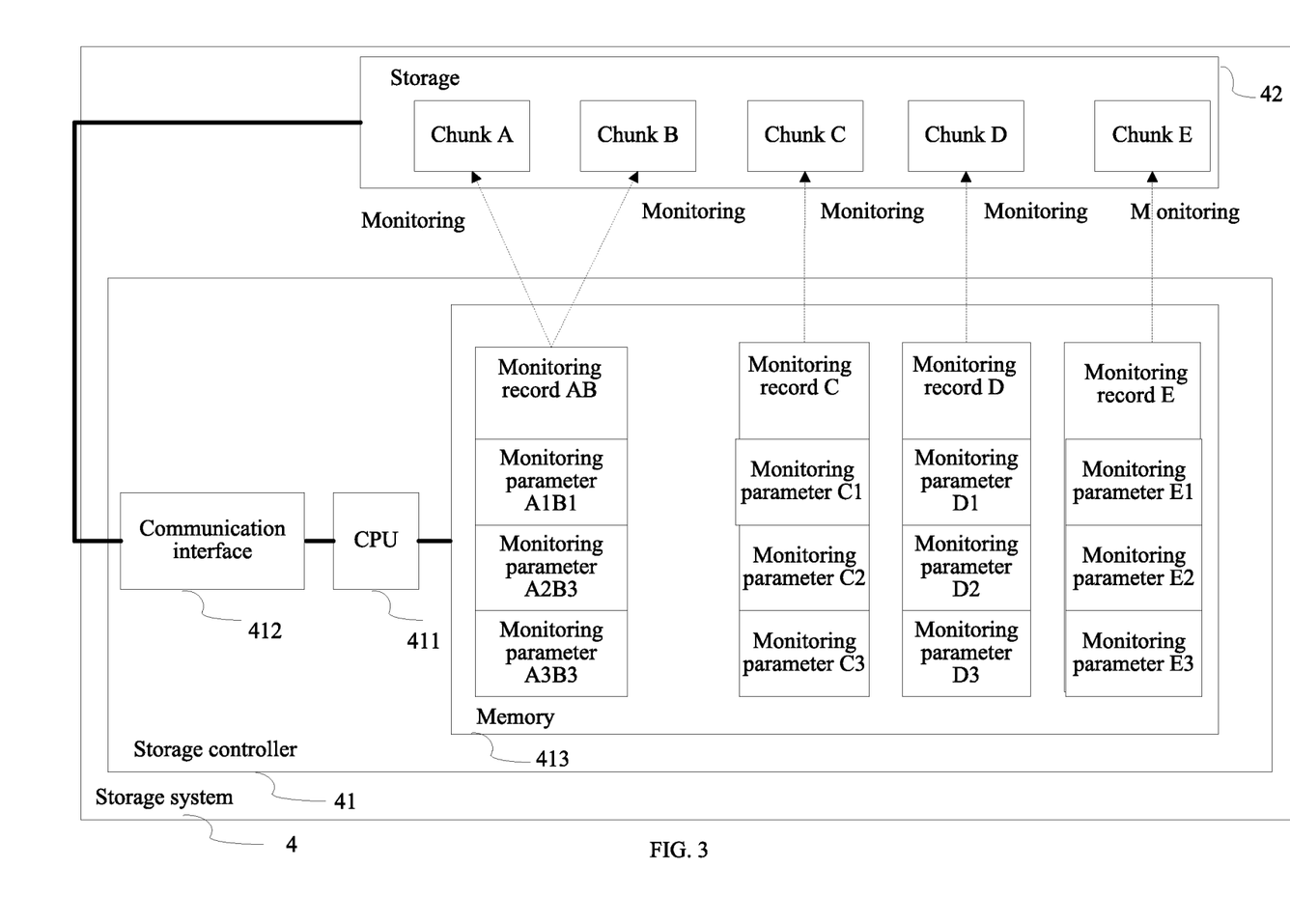
FIG. 3 is a structural diagram of an embodiment of the present invention.

Referring to FIG. 2 or FIG. 3, a storage system 4 is formed by a storage controller 41 and a storage 42, where the storage controller 41 includes a CPU 411, a communication interface 412 communicating with the CPU 411, and a memory 413 communicating with the CPU 411. The storage controller communicates with the storage 42 through the communication interface 412. The CPU 411 runs a computer program, where the computer program may include a program code, and steps shown in FIG. 4 may be performed to run the program code.

Figure 4:
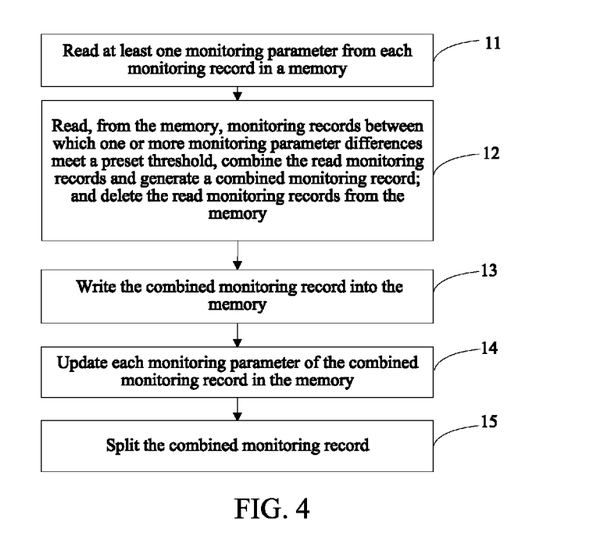
FIG. 4 is a flowchart of a monitoring record management method according to an embodiment of the present invention.

Step 11: Read at least one monitoring parameter from each monitoring record in the memory.

In this step, each monitoring record is used to monitor one chunk in the storage, each monitoring record is formed by at least one monitoring parameter, and each monitoring parameter is obtained by monitoring an input/output situation of an IO request for a chunk. Referring to an example in FIG. 2, totally five monitoring records exist in the memory 413, which are a monitoring record A, a monitoring record B, a monitoring record C, a monitoring record D, and a monitoring record E respectively. Each monitoring record is used to monitor one chunk, and five chunks are monitored in total, and each monitoring record includes three monitoring parameters, for example, the monitoring record A includes a monitoring parameter A1, a monitoring parameter A2, and a monitoring parameter A3, where the three monitoring parameters may be, for example, IOPS, an input/output frequency, and an IO count respectively.

Step 11 may be actively triggered by a user, or may also be automatically triggered by the storage system according to a preset threshold condition. For example, when an existing monitoring parameter fully occupies the memory, that is to say, the memory has no more space for storing more monitoring records, step 11 is performed. At this time, if a new chunk needs to be monitored, a situation that no memory can be used by a monitoring parameter of the new chunk occurs. Alternatively, a monitored chunk is generally small, for example, it has the size of only several Ks, it is not necessary to separately set a monitoring parameter for each chunk, and step 11 may also be performed.

Step 12: Read, from the memory, monitoring records between which one or more monitoring parameter differences meet a preset threshold, combine the read monitoring records and generate a combined monitoring record, wherein identities of monitored chunks are recorded in the combined monitoring record; and delete the read monitoring records from the memory, where a value of each monitoring parameter in the combined monitoring record is equal to a value of each monitoring parameter when multiple monitored chunks are viewed as one chunk.

In embodiments of the present invention, combining the read monitoring records and generating a combined monitoring record refer to combining, among the read monitoring records, monitoring records between which one or more monitoring parameter differences meet a preset threshold. According to different application objectives, a threshold of each monitoring parameter difference may be designated by a user. Identities of monitored chunks are carried in the combined monitoring record, and different chunks have different identities.

Before the combination, each monitoring record also records an identity of chunks monitored by each monitoring record. The combined monitoring record is used to monitor multiple chunks, and therefore identities of the multiple chunks are recorded in the combined monitoring record, and different chunks have different identities. Through an identity, the user may know which chunks are specifically monitored by the monitoring record.

In this step, difference threshold detection is performed on a content read in step 11. The number of detected monitoring parameters may be one or multiple, that is to say, only one monitoring parameter may be determined, and if in different monitoring records, a difference of the monitoring parameter meets a threshold, where a manner of meeting the threshold is that the difference is smaller than or is not larger than a specific value, these monitoring records are read wholly. It is assumed that in step 11, the read monitoring parameter includes the IOPS, and IOPS recorded in the monitoring record A, the monitoring record B, the monitoring record C, the monitoring record D, and the monitoring record E is 50, 52, 60, 61, and 70 respectively, and a threshold of the IOPS is 3, that is to say, monitoring records between which a difference of the IOPS is smaller than 3 all meet a combination condition. A difference between the IOPS of the monitoring record A and the IOPS of the monitoring record B 52−50=2 meets the threshold, and a difference between the IOPS of the monitoring record C and the IOPS of the monitoring record D 61−60=1 also meets the threshold. Therefore, each monitoring parameter of the monitoring record A and each monitoring parameter of the monitoring record B are read from the memory and are separately combined, a monitoring record of a chunk A and a monitoring record of a chunk B are also recorded in a combined monitoring record, and each monitoring parameter of the monitoring record C and each monitoring parameter of the monitoring record D are also read from the memory and are combined, and a monitoring record of a chunk C and a monitoring record of a chunk D are also recorded in a combined monitoring record.

To conveniently understand a situation that threshold detection is performed on differences of monitoring parameters of different types, an example is further taken in the following based on the foregoing example. It is assumed that in addition to the IOPS, differences of monitoring parameter IO counts (IO count) are further compared, and IO counts in the monitoring record A, the monitoring record B, the monitoring record C, the monitoring record D, and the monitoring record E are 10, 11, 20, 30, and 40 respectively, and a threshold of the IO count is 5, that is to say, only a difference between the IO count of a monitoring record A and the IO count of a monitoring record B 11−10=1 meets a requirement of being smaller than the threshold. In this way, the monitoring record A and the monitoring record B meet threshold requirements of the IOPS and the IO count at the same time, and although the monitoring record C and the monitoring record D meet a threshold requirement of the IOPS, the monitoring record C and the monitoring record D do not meet a threshold requirement of the IO count. Therefore, only the monitoring record A and the monitoring record B are read from the memory and are combined to generate a combined monitoring record, and neither the monitoring record C nor the monitoring record D is read from the memory.

A value of a combined monitoring parameter is equal to a value of each monitoring parameter when monitored chunks are viewed as one chunk, or a value of a monitoring parameter obtained when a set of monitored chunks is monitored, and an IO request for any chunk in a set of chunks is marked as an IO request for the whole set of chunks. The value of the combined monitoring parameter is generated by combining monitoring parameters of all monitored chunks, and a chunk monitored by the combined monitoring parameter is a set formed by chunks monitored by the monitoring parameters that are combined. An I/O request record of a chunk monitored by a monitoring record is recorded in the monitoring record before the combination. I/O request records of a set of monitored chunks are recorded in the combined monitoring record.

In this way, a monitoring granularity is enlarged equivalently, and originally recording a monitoring parameter of a single chunk is changed to recording monitoring parameters of multiple chunks. That is to say, monitoring records that are combined originally monitor their own chunk, in the combined monitoring record, a value of each monitoring parameter is equal to a value obtained by monitoring these chunks together, and in the combined monitoring record, each monitoring parameter may also be called a combined monitoring parameter.

For example, in FIG. 2, the monitoring record A and the monitoring record B are both formed by three monitoring parameters, which are IOPS, an IO count, and an IO frequency respectively, where in the monitoring record A, a value of the IOPS is 50, a value of the IO count is 10, and a value of the IO frequency is 10; and in the monitoring record B, a value of the IOPS is 52, a value of the IO count is 11, and a value of the IO frequency is 20. In this embodiment of the present invention, values of monitoring parameters are directly added, and if a set formed by the chunk A and the chunk B is viewed as a new chunk AB, by taking the IOPS as an example, an IO for the chunk A or the chunk B belongs to an IO for the chunk AB, and the IO should be counted into combined IOPS. Therefore, values of monitoring parameters in the combined monitoring record are that: IOPS=50+52=102, IO count=10+11=21, and IO frequency=10+20=30. Because a combined monitoring parameter generated by combination is integrated with contents of monitoring parameters that are combined, and IO situations of chunks monitored by the monitoring parameters that are combined are recorded in the combined monitoring record, monitoring records that are combined may be deleted and are replaced with the combined monitoring record. It should be particularly noted that, an operation of deleting the monitoring records that are combined may be performed after these parameters are read and before a combination operation is completed, or may also be performed after the combination operation is completed, where the former can release a space of the memory as early as possible, and the latter can improve the security, for example, data loss incurred because of power interruption that occurs when the combined monitoring record is not calculated can be avoided.

In this embodiment of the present invention, a cold-hot degree of a chunk can be determined through these two monitoring parameters: IOPS and an IO count. If IOPS and IO counts in two monitoring records are approximate, it is considered that cold-hot degrees of chunks that correspond to these two monitoring records are approximate. If the chunks are both hot chunks, the chunks may be migrated together to a storage medium where an input speed is fast, and if the chunks are both cold data, the chunks may be migrated together to a storage medium where an input speed is slow.

In this embodiment of the present invention, a cold-hot change rule of a chunk can be determined through three monitoring parameters: a cold-hot change time point, a cold-hot change time interval, and a sudden IO access frequency. If in two monitoring records, differences of these three monitoring parameters meet their respective preset thresholds, that is to say, cold-hot change time points are approximate, cold-hot change time intervals are approximate, and the numbers of sudden IOs are approximate, it is considered that chunks monitored by these two monitoring records have approximate cold-hot change rules, and monitoring records of these chunks may be combined and stored.

Step 13: Write the combined monitoring record into the memory, where the combined monitoring record is used to monitor chunks monitored by each monitoring record before the combination.

After being written into the memory, the combined monitoring parameter may be used by a user as the rest monitoring parameters that are not combined. The example in this embodiment is continuously taken. Referring to FIG. 3, a monitoring record AB is generated by combining the monitoring record A and the monitoring record B in FIG. 2, and dashed lines in FIG. 2 and FIG. 3 represent correspondence between a monitoring record and a chunk. The number of monitoring records in the memory is reduced from five in FIG. 2 to four in FIG. 3, which reduces the occupancy of a space of the memory.

A value of each monitoring parameter in the monitoring record AB is generated by combining monitoring parameters in the monitoring record A and the monitoring record B, and the monitoring record AB may monitor IO requests for the chunk A and the chunk B at the same time.

Embodiment 2

As shown in FIG. 4, based on Embodiment 1, the method may further include step S14.

Step S14: Monitor an I/O request of a host for a chunk in a storage, and use an I/O request record of a chunk monitored by a combined monitoring record to update each monitoring parameter of the combined monitoring record in the memory, that is to say, each newly added IO request is counted into a monitoring parameter in the combined monitoring record as long as the newly added IO request is an IO request for a chunk monitored by the combined monitoring record. A specific example in Embodiment 1 is taken, and if after the combined monitoring record is written into the memory, a new IO request for accessing the chunk A or accessing the chunk B exists, the new IO request is counted into the monitoring record AB.

Embodiment 3

In addition, based on Embodiment 1 or 2, a monitoring record splitting method may further be included. Reference is made to step S15 for a splitting method 1. After monitoring record combination is completed, if required, a combined monitoring record may be split again and stored in a memory, and in this embodiment, a monitoring record generated through splitting is called a split monitoring record. For example, when a large number of spaces of the memory are idle, or a user expects to reduce a monitoring granularity, the splitting method is that, the combined monitoring record is read from the memory, and the combined monitoring record is split into at least one split monitoring record, where each split monitoring record is used to monitor at least one chunk, and in the split monitoring record, a value of each monitoring record is equal to a value of each monitoring record when monitored chunks are viewed as one chunk.

An identity of a monitored chunk is carried in the combined monitoring record. When one combined monitoring record is used to monitor three or more than three monitoring records, the splitting method is not unique anymore. For example, the combined monitoring record is used to monitor three chunks, the combined monitoring record may be split into three monitoring records, and each monitoring record is used to monitor one chunk; or the combined monitoring record may also be split into two monitoring records, and one of the monitoring records is used to monitor two chunks, and the other monitoring record is used to monitor one chunk.

Splitting of a monitoring record is an inverse process of combination of a monitoring record, and on the basis of understanding Embodiments 1 and 2, multiple splitting methods may exist, for example, after the splitting, each monitoring parameter may be apportioned according to the number of monitored chunks. A simple example is that: in a monitoring record that monitors three chunks, a monitoring parameter IOPS=60, and if the monitoring record is split into two parts, one part monitors two chunks, and the other part monitors one chunk, and in the split monitoring record, IOPS of the former=40, and IOPS of the latter=20.

Figure 5:
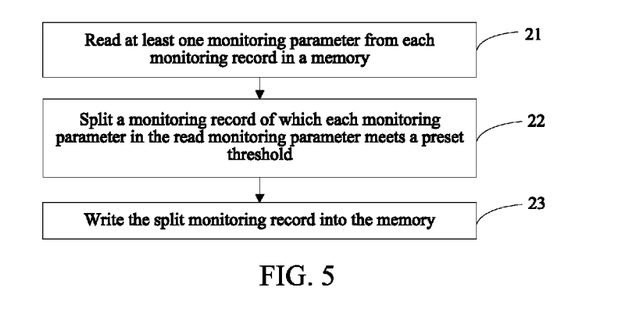
FIG. 5 is a flowchart of an embodiment of a monitoring record splitting method according to an embodiment of the present invention.

This embodiment further provides another splitting method. Referring to FIG. 5, a splitting process may not depend on the number of chunks monitored by monitoring data or the size of a chunk, a combined monitoring record or a monitoring record of a single chunk is split, and a monitoring record generated through splitting is called a split monitoring record. That is to say, the method shown in FIG. 5 may be performed together with that in Embodiments 1 and 2, may also be separately performed. A split monitoring record may carry an offset address and a length of monitored data, or may also further carry a chunk to which the monitoring data belongs. In the split monitoring record, a sum of values of monitoring parameters is equal to a value of a monitoring parameter in the combined monitoring record. In an implementation manner, a value of each monitoring parameter may be apportioned according to a percentage of the amount of monitored data to the amount of data monitored by a monitoring record that is split, that is to say, a monitoring parameter is apportioned into each split monitoring record according to a data length carried in each split monitoring record.

The splitting method shown in FIG. 5 includes the following steps.

Step 21: Read at least one monitoring parameter from each monitoring record in a memory.

Step 22: splitting a monitoring record of which each value of the monitoring parameter meets a preset threshold, and generating at least two monitoring records after the splitting, wherein an offset address and a data length of data are carried in each split monitoring record, a sum of values of monitoring parameters in the split monitoring record is equal to a value of a monitoring parameter of the same type in a combined monitoring record.

Step 23: writing the split monitoring records into the memory, wherein the split monitoring records are used to monitor data described by the offset address and the data length that are carried in the split monitoring record.

A simple example is that: A monitoring parameter IOPS in a monitoring record=60, and the monitoring record is used to monitor any number of chunks. If the monitoring record is split into two monitoring records, and if each monitoring parameter in the monitoring record is apportioned according to the length of data amount, where if the amount of data monitored by a first monitoring record is two times of that monitored by a second monitoring record, in split monitoring records, the IOPS of the former=40 and the IOPS of the latter=20. Each monitoring record further carries an offset address and a length of monitored data, where the offset address is a start address of the data and the monitored data may be found through the offset address and the length.

Randomness may be used as a basis of whether to split a monitoring record: A monitoring record in the memory is analyzed, two monitoring parameters: the number of random IOs and the total number of IOs are found, and a proportion of the number of random IOs to the total number of IOs is used as randomness. For data in a chunk that has high randomness, access frequencies of different parts may differ to a great extent, and for such a monitoring record, in a case that the memory is enough, splitting may improve monitoring precision. The number of random IOs and the total number of IOs are both monitoring parameters. Relative to consecutive IOs, a random IO means that for two different input/output IOs, a previous end address and a next start address differ to a great extent, a threshold may be designated by a user, and if a difference between the previous end address and the next start address exceeds the threshold, these two IOs are considered as a random IO; and consecutive IOs means that, for two different input/output IOs, a difference between a previous end address and a next start address is not large. In other embodiments, other parameters other than the randomness may be used, for example, a monitoring record of which IOPS is larger than a preset threshold is split, or a monitoring record of which an output IO size and IO latency meet their respective thresholds is split.

Embodiment 4

An embodiment of the present invention further provides a monitoring record management device, where the device may be, for example, a storage controller or a program that is run on a storage controller, and the device may apply the foregoing method. A storage system is formed by a storage controller, a memory, and a storage, where multiple monitoring records are stored in the memory, each monitoring record is used to monitor one chunk in the storage, and one monitoring record is a set of monitoring parameters of one chunk, where the monitoring parameter includes, for example, input/out operations per second IOPS of a monitored chunk, an input/output frequency of the chunk, and input/output randomness of the chunk. A monitoring program monitors an input/output request of the chunk, and updates a monitoring record in the memory in real time by using a monitoring result. In a network storage technology (Network Storage Technologies, NAS) or a storage area network (Storage Area Network, SAN), a storage controller is physically independent relative to a storage, and in a storage server, the storage server itself has a storage controller, which is equivalent to that the storage controller is integrated in the storage server, and therefore, the method is performed by the storage server itself, and in a storage system of other forms, the method may be performed by a device that has a calculation capability similar to that of the storage controller. In the embodiment of the present invention, no matter whether it is physically independent, a storage controller that has a function similar to that of the storage controller in the NAS or the SAN is collectively called a storage controller.

Figure 6:
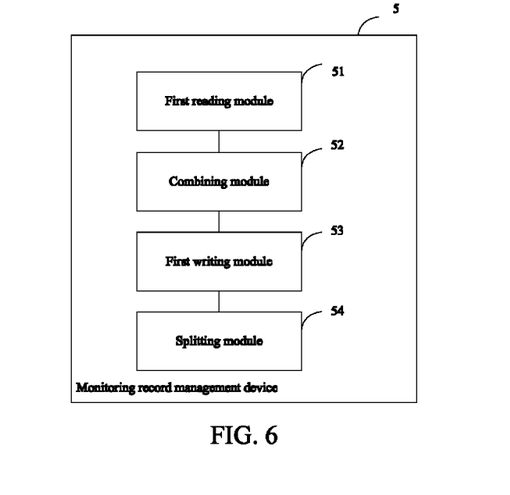
FIG. 6 is structural diagram of a monitoring record management device according to an embodiment of the present invention.

Referring to FIG. 6, a monitoring record management device 5 includes a first reading module 51, a combining module 52 that is connected to the first reading module 51, and a first writing module 53 that is connected to the combining module 52, and a function of each function module is continuously introduced one by one in the following.

The first reading module 51 is configured to read at least one monitoring parameter from each monitoring record in the memory.

In this step, each monitoring record is used to monitor one chunk in the storage, each monitoring record is formed by at least one monitoring parameter, and each monitoring parameter is obtained by monitoring an input/output situation of an IO request for a chunk. Referring to the example in FIG. 2, totally five monitoring records exist in the memory, which are a monitoring record A, a monitoring record B, a monitoring record C, a monitoring record D, and a monitoring record E respectively. Each monitoring record is used to monitor one chunk, and five chunks are monitored in total, and each monitoring record includes three monitoring parameters, for example, the monitoring record A includes a monitoring parameter A1, a monitoring parameter A2, and a monitoring parameter A3, where the three monitoring parameters may be, for example, IOPS, an input/output frequency, and an IO count respectively.

The performing of an action of the first reading module may be actively triggered by a user, or may also be automatically triggered by the storage system according to a preset threshold condition. For example, when an existing monitoring parameter fully occupies the memory, that is to say, the memory has no more space for storing more monitoring records, the action of the first reading module is performed. At this time, if a new chunk needs to be monitored, a situation that no memory can be used by a monitoring parameter of the new chunk occurs. Alternatively, a monitored chunk is generally small, for example, it has the size of only several Ks, and it is not necessary to separately set a monitoring parameter for each chunk, and the action of the first reading module may also be performed.

The combining module 52 is configured to read, from the memory, monitoring records between which one or more monitoring parameter differences meet a preset threshold, combine the read monitoring records and generate a combined monitoring record, where identities of monitored chunks recorded in the combined monitoring record, and delete the read monitoring records from the memory, where a value of each monitoring parameter in the combined monitoring record is equal to a value of each monitoring parameter when multiple monitored chunk are viewed as one chunk.

In embodiments of the present invention, combining the read monitoring records and generating a combined monitoring record refers to combining, among the read monitoring records, monitoring records between which one or more monitoring parameter differences meet a preset threshold. According to different application objectives, a threshold of each monitoring parameter difference may be designated by a user. An identity of a monitored chunk is carried in the combined monitoring record, and different chunks have different identities.

Before the combination, each monitoring record also records an identity of chunks monitored by each monitoring record. The combined monitoring record is used to monitor multiple chunks, and therefore identities of the multiple chunks are recorded in the combined monitoring record, and different chunks have different identities. Through an identity, the user may know which chunks are specifically monitored by the monitoring parameter.

The combining module 52 performs difference threshold detection on a content read by the reading module 51. The number of detected monitoring parameters may be one or multiple, that is to say, only one monitoring parameter may be determined, and if in different monitoring records, a difference of the monitoring parameter meets a threshold, where a manner of meeting the threshold is that the difference is smaller than or is not larger than a specific value, these monitoring records are read wholly. It is assumed that in step 11, the read monitoring parameter includes the IOPS, and IOPS recorded in the monitoring record A, the monitoring record B, the monitoring record C, the monitoring record D, and the monitoring record E is 50, 52, 60, 61, and 70 respectively, and a threshold of the IOPS is 3, that is to say, monitoring records between which a difference of the IOPS is smaller than 3 all meet a combination condition. A difference between the IOPS of the monitoring record A and the IOPS of the monitoring record B 52−50=2 meets the threshold, and a difference between the IOPS of the monitoring record C and the IOPS of the monitoring record D 61−60=1 also meets the threshold. Therefore, each monitoring parameter of the monitoring record A and each monitoring parameter of the monitoring record B are read from the memory and are separately combined, a monitoring record of a chunk A and a monitoring record of a chunk B are also recorded in a combined monitoring record; and the monitoring record C and the monitoring record D are also read from the memory and are combined, and a monitoring record of a chunk C and a monitoring record of a chunk D are also recorded in a combined monitoring record.

To conveniently understand a situation that threshold detection is performed on differences of monitoring parameters of different types, an example is further taken in the following based on the foregoing example. It is assumed that in addition to the IOPS, differences of monitoring parameter IO counts (IO count) are further compared, and IO counts in the monitoring parameter A, the monitoring record B, the monitoring record C, the monitoring record D, and the monitoring record E are 10, 11, 20, 30, and 40 respectively, and a threshold of the IO count is 5, that is to say, only a difference between the IO count of a monitoring parameter A and the IO count of a monitoring parameter B 11−10=1 meets a requirement of being smaller than the threshold. In this way, the monitoring record A and the monitoring record B meet threshold requirements of the IOPS and the IO count at the same time, and although the monitoring record C and the monitoring record D meet a threshold requirement of the IOPS, the monitoring record C and the monitoring record D do not meet a threshold requirement of the IO count. Therefore, only the monitoring record A and the monitoring record B are read from the memory and are combined to generate a combined monitoring record, and neither the monitoring record C nor the monitoring record D is read from the memory.

A value of a combined monitoring parameter is equal to a value of each monitoring parameter when monitored chunks are viewed as one chunk, or a value of a monitoring parameter obtained when a set of monitored chunks is monitored, and an IO request for any chunk in a set of chunks is marked as an IO request for the whole set of chunks. The value of the combined monitoring parameter is generated by combining monitoring parameters of all monitored chunks, and a chunk monitored by the combined monitoring parameter is a set formed of chunks monitored by the monitoring parameters that are combined. An I/O request record of a chunk monitored by a monitoring record is recorded in the monitoring record before the combination. I/O request records of a set of monitored chunks are recorded in the combined monitoring record.

In this way, a monitoring granularity is enlarged equivalently, and originally recording a monitoring parameter of a single chunk is changed to recording monitoring parameters of multiple chunks. That is to say, monitoring records that are combined originally monitor their own chunk, in a combined monitoring record, a value of each monitoring parameter is equal to a value obtained by monitoring these chunks together, and in the combined monitoring record, each monitoring parameter may also be called a combined monitoring parameter.

For example, in FIG. 2, the monitoring record A and the monitoring record B are both formed by three monitoring parameters, which are IOPS, an IO count, and an IO frequency respectively, where in the monitoring record A, a value of the IOPS is 50, a value of the IO count is 10, and a value of the IO frequency is 10; and in the monitoring record B, a value of the IOPS is 52, a value of the IO count is 11, and a value of the IO frequency is 20. In this embodiment of the present invention, values of monitoring parameters are directly added, and if a set formed by the chunk A and the chunk B is viewed as a new chunk AB, by taking the IOPS as an example, an IO for the chunk A or the chunk B belongs to an IO for the chunk AB, and the IO should be counted into combined IOPS. Therefore, values of monitoring parameters in the combined monitoring record are that: IOPS=50+52=102, IO count=10+11=21, and IO frequency=10+20=30. Because a combined monitoring parameter generated by combination is integrated with contents of monitoring parameters that are combined, and IO situations of chunks monitored by the monitoring parameters that are combined are recorded in the combined monitoring record, monitoring records that are combined may be deleted and are replaced with the combined monitoring record. It should be particularly noted that, an operation of deleting the monitoring records that are combined may be performed after these parameters are read and before a combination operation is completed, or may also be performed after the combination operation is completed, where the former can release a space of the memory as early as possible, and the latter can improve the security, for example, data loss incurred because of power interruption that occurs when the combined monitoring record is not calculated can be avoided.

In this embodiment of the present invention, a cold-hot degree of a chunk can be determined through these two monitoring parameters: IOPS and an IO count. If IOPS and IO counts in two monitoring records are approximate, it is considered that cold-hot degrees of chunks that correspond to these two monitoring records are approximate. If the chunks are both hot chunks, the chunks may be migrated together to a storage medium where an input speed is fast, and if the chunks are both cold data, the chunks may be migrated together to a storage medium where an input speed is slow.

In this embodiment of the present invention, a cold-hot change rule of a chunk can be determined through three monitoring parameters: a cold-hot change time point, a cold-hot change time interval, and a sudden IO access frequency. If in two monitoring records, differences of these three monitoring parameters meet their respective preset thresholds, that is to say, cold-hot change time points are approximate, cold-hot change time intervals are approximate, and the number of sudden IOs are approximate, it is considered that chunks monitored by these two monitoring records have approximate cold-hot change rules, and monitoring records of these chunks may be combined and stored.

The first writing module 53 is configured to write the combined monitoring record into the memory, where the combined monitoring record is used to monitor chunks monitored by each monitoring record before the combination.

After being written into the memory, the combined monitoring parameter may be used by a user as the rest monitoring parameters that are not combined. The example in this embodiment is continuously taken. Referring to FIG. 3, a monitoring record AB is generated by combining the monitoring record A and the monitoring record B in FIG. 2. The number of monitoring records in the memory is reduced from five in FIG. 2 to four in FIG. 3, which reduces the occupancy of a space of the memory.

A value of each monitoring parameter in the monitoring record AB is generated by combining monitoring parameters in the monitoring record A and the monitoring record B, and the monitoring record AB may monitor IO requests for the chunk A and the chunk B at the same time.

Embodiment 5

Referring to FIG. 6, based on Embodiment 4, the writing module may further be configured to monitor an I/O request of a host for a chunk in a storage and use an I/O request record of a chunk monitored by a combined monitoring record to update each monitoring parameter of the combined monitoring record in a memory. That is to say, each newly added IO request is counted into a monitoring parameter in the combined monitoring record as long as the newly added IO request is an IO request for a chunk monitored by the combined monitoring record. A specific example in Embodiment 4 is taken, and if after the combined monitoring record is written into the memory, a new IO request for accessing the chunk A or accessing the chunk B exists, the new IO request is counted into the monitoring record AB.

Embodiment 6

In addition, based on Embodiment 4 or 5, a splitting module 54 that is connected to the first writing module 53 may further be included. Referring to FIG. 6, after monitoring record combination is completed, if required, the splitting module 54 may split a combined monitoring record again and store a split monitoring record into the memory, and in this embodiment, a monitoring record generated through splitting is called a split monitoring record. For example, when a large number of spaces of the memory are idle, or a user expects to reduce a monitoring granularity, a function of the splitting module 54 is used for reading the combined monitoring record from the memory and splitting the combined monitoring record into at least one split monitoring record, where each split monitoring record is used to monitor at least one chunk, and in the split monitoring record, a value of each monitoring record is equal to a value of each monitoring record when monitored chunks are viewed as one chunk.

An identity of a monitored chunk is carried in the combined monitoring record. When one combined monitoring record is used to monitor three or more than three monitoring records, the splitting method is not unique anymore. For example, the combined monitoring record is used to monitor three chunks, the combined monitoring record may be split into three monitoring records, and each monitoring record is used to monitor one chunk; or the combined monitoring record may also be split into two monitoring records, and one of the monitoring records is used to monitor two chunks, and the other monitoring record is used to monitor one chunk.

Splitting of a monitoring record is an inverse process of combination of a monitoring record, and on the basis of understanding Embodiments 1, 2, 4, and 5, multiple splitting methods may exist, for example, after the splitting, each monitoring parameter may be apportioned according to the number of monitored chunks. A simple example is that: in a monitoring record that monitors three chunks, a monitoring parameter IOPS=60, and if the monitoring record is split into two parts, one part monitors two chunks, and the other part monitors one chunk, and in the split monitoring record, IOPS of the former=40, and the IOPS of the latter=20.

Embodiment 7

Figure 7:
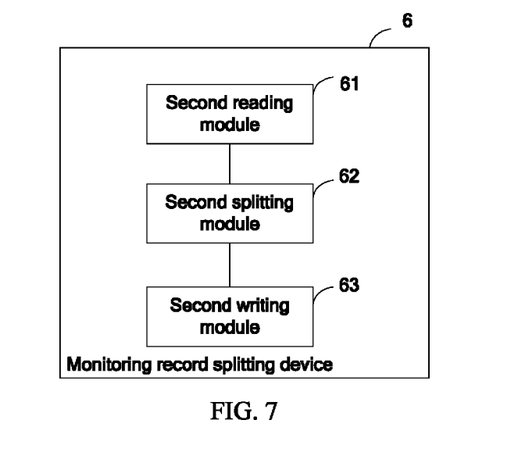
FIG. 7 is a structural diagram of a monitoring record splitting device according to an embodiment of the present invention.

This embodiment provides another splitting technology. Referring to FIG. 7, a splitting process may not depend on the number of chunks monitored by monitoring data or the size of a chunk, a combined monitoring record or a monitoring record of a single chunk is split, and a monitoring record generated through splitting is called a split monitoring record. A split monitoring record may carry an offset address and a length of monitored data, or may also further carry a chunk to which the monitoring data belongs. In the split monitoring record, a sum of values of monitoring parameters is equal to a value of a monitoring parameter in the combined monitoring record. In an implementation manner, a value of each monitoring parameter may be apportioned according to a percentage of the amount of monitored data to the amount of data monitored by a monitoring record that is split, that is to say, a monitoring parameter is apportioned into each split monitoring record according to a data length carried in each split monitoring record.

A chunk splitting device shown in FIG. 7 includes a second reading module 61, a second splitting module 62 that is connected to the second reading module, and a second writing module 63 that is connected to the second splitting module.

The second reading module 61 is configured to read at least one monitoring parameter from each monitoring record in a memory, where these monitoring records may be combined monitoring records, or may also be monitoring records that are not combined.

The second splitting module 62 is configured to split a monitoring record of which each monitoring parameter in the read monitoring parameter meets a preset threshold, and generate at least two monitoring records after the splitting, where an offset address and a data length of data are carried in each split monitoring record, and in the split monitoring record, a sum of values of monitoring parameters is equal to a value of a monitoring parameter in the combined monitoring record. A ratio of a value of each monitoring parameter in the split monitoring record to a value of a corresponding monitoring parameter in the monitoring record that is split may be a ratio of the amount of data monitored by the split monitoring record to the amount of data monitored by the monitoring record that is split.

The second writing module writes the split monitoring record into the memory, where the split monitoring record is used to monitor data that carries an offset address and a data length.

A simple example is that: A monitoring parameter IOPS in a monitoring record=60, and the monitoring record is used to monitor any number of chunks. If the monitoring record is split into two monitoring records, and if each monitoring parameter in the monitoring record is apportioned according to the length of data amount, where if the amount of data monitored by a first monitoring record is two times of that monitored by a second monitoring record, in split monitoring records, the IOPS of the former=40 and the IOPS of the latter=20. Each monitoring record further carries an offset address and a length of monitored data, where the offset address is a start address of the data and the monitored data may be found through the offset address and the length.

Randomness may be used as a basis of whether to split a monitoring record: A monitoring record in the memory is analyzed, two monitoring parameters: the number of random IOs and the total number of IOs are found, and a proportion of the number of random IOs to the total number of IOs is used as randomness. For data in a chunk that has high randomness, access frequencies of different parts may differ to a great extent, and for such a monitoring record, in a case that the memory is enough, splitting may improve monitoring precision. The number of random IOs and the total number of IOs are both monitoring parameters. Relative to consecutive IOs, a random IO means that for two different input/output IOs, a previous end address and a next start address differ to a great extent, a threshold may be designated by a user, and if a difference between the previous end address and the next start address exceeds the threshold, it is considered as a random IO; and consecutive IOs means that, for two different input/output IOs, a difference between a previous end address and a next start address is not large. In other embodiments, other parameters other than the randomness may be used, for example, a monitoring record of which IOPS is larger than a preset threshold is split, or a monitoring record of which an output IO size and IO latency meet their respective thresholds is split.

In this embodiment of the present invention, that each monitoring parameter meets a preset threshold may be that a monitoring parameter itself meets a threshold, or may also be that after being calculated through a preset algorithm, a monitoring parameter meets a threshold, for example, a difference between two monitoring parameters meets a threshold or a ratio between two monitoring parameters meets a threshold.

It should be particularly noted that, in the foregoing embodiments, for the convenience of taking an example, monitoring parameters that are combined monitor only one chunk. In practice, a combined monitoring record may further be combined again, and persons skilled in the art understand that, because combining the combined monitoring record again is just a repeated application of the foregoing embodiments of the present invention, details are not described herein again. In a similar way, a split monitoring record may be split again.

Through the foregoing description of the embodiments, it may be clearly understood by persons skilled in the art that the present invention may be implemented by software plus necessary universal hardware, and definitely may also be implemented by hardware, but in many cases, the software implementation is preferred. Based on such an understanding, the technical solutions of the present invention essentially, or the part contributing to the prior art may be implemented in the form of a software product. The computer software product is stored in a readable storage medium, for example, a floppy disk, a hard disk, or an optical disk of a computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A monitoring record management method, wherein multiple monitoring records are stored in a memory, each monitoring record is used to monitor one or more chunks in a storage, and the monitoring record is a set of at least one monitoring parameter, and the method comprises:
    reading at least one monitoring parameter from monitoring records in the memory;
    for the read monitoring parameter, calculating a difference of monitoring parameters of a same type between different monitoring records;
    reading, from the memory, monitoring records between which each monitoring parameter difference meets a corresponding preset threshold, combining the read monitoring records and generating a combined monitoring record, wherein identities of monitored chunks are recorded in the combined monitoring record, and deleting, from the memory, the monitoring records that are combined, wherein a value of at least one monitoring parameter in the combined monitoring record is equal to a value of each monitoring parameter when all monitored chunks are viewed as one chunk; and
    writing the combined monitoring record into the memory, wherein the combined monitoring record is used to monitor chunks monitored by each monitoring record before the combination.

2. The monitoring record management method according to claim 1, after the writing the combined monitoring record into the memory, further comprising:
    monitoring an input/output (I/O) request for a chunk in the storage; and
    updating each monitoring parameter of the combined monitoring record in the memory according to the I/O request of the chunk, wherein the I/O request is monitored by the combined monitoring record.

3. The monitoring record management method according to claim 1, wherein the step of the reading, from the memory, monitoring records between which each monitoring parameter difference meets a corresponding preset threshold is:
    reading, from the memory, monitoring records between which a difference of input/output operations per second (IOPS) value meets a preset IOPS threshold and a difference of JO times meets a preset JO times threshold.

4. The monitoring record management method according to claim 1, after the writing the combined monitoring record into the memory, further comprising:
    reading the combined monitoring record from the memory, and splitting the combined monitoring record into at least two split monitoring records, wherein each split monitoring record is used to monitor at least one chunk, and a sum of values of monitoring parameters in the split monitoring records is equal to a value of a monitoring parameter in the combined monitoring record; and
    deleting the read combined monitoring record from the memory, and writing each split monitoring record into the memory.

5. The monitoring record management method according to claim 2, after the writing the combined monitoring record into the memory, further comprising:
    reading the combined monitoring record from the memory, and splitting the combined monitoring record into at least two split monitoring records, wherein each split monitoring record is used to monitor at least one chunk, and a sum of values of monitoring parameters in the split monitoring records is equal to a value of a monitoring parameter in the combined monitoring record; and deleting the read combined monitoring record from the memory, and writing each split monitoring record into the memory.

6. The monitoring record management method according to claim 3, after the writing the combined monitoring record into the memory, further comprising:

reading the combined monitoring record from the memory, and splitting the combined monitoring record into at least two split monitoring records, wherein each split monitoring record is used to monitor at least one chunk, and a sum of values of monitoring parameters in the split monitoring records is equal to a value of a monitoring parameter in the combined monitoring record; and deleting the read combined monitoring record from the memory, and writing each split monitoring record into the memory.

7. The monitoring record management method according to claim 1, wherein the at least one monitoring parameter value in the combined monitoring record is equal to a value of each monitoring parameter when monitored chunks are viewed as one chunk, which specifically is:

the value of the at least one monitoring parameter in the combined monitoring record is equal to a sum of monitoring parameter values of a same type of chunks monitored by the combined monitoring record.

8. A monitoring record splitting method, wherein multiple monitoring records are stored in a memory, and each monitoring record is used to monitor at least one chunk in a storage, each monitoring record is a set of monitoring parameters of a monitored chunk, and the method comprises:

reading at least one monitoring parameter from each monitoring record in the memory;

splitting a monitoring record of which each value of the monitoring parameter meets a preset threshold, and generating at least two monitoring records after the splitting, wherein an offset address and a data length of data are carried in each split monitoring record, a sum of values of monitoring parameters in the split monitoring record is equal to a value of a monitoring parameter of a same type in a combined monitoring record; and writing the split monitoring records into the memory, wherein the split monitoring records are used to monitor data described by the offset address and the data length that are carried in the split monitoring record.

9. The monitoring record splitting method according to claim 8, wherein a value of each monitoring parameter in each split monitoring record specifically is:

a value obtained by apportioning a value of each monitoring parameter in the monitoring record before the splitting into each split monitoring record according to a data length carried in each split monitoring record.

10. A storage controller, comprising a processor, a communication interface communicating with the processor, and a memory communicating with the processor, wherein the communication interface is configured to communicate with a storage;

the memory is configured to store multiple monitoring records, wherein each monitoring record is used to monitor one chunk in the storage, and one monitoring record is a set of monitoring parameters of one chunk; and the processor is configured to perform a program, wherein the program is used to:

read, from monitoring records in the memory, at least one monitoring parameter;

for the read monitoring parameter, calculate a difference of monitoring parameters of a same type between different monitoring records;

read, from the memory, monitoring records between which each monitoring parameter difference meets a corresponding preset threshold, combining the read monitoring records and generating a combined monitoring record, wherein identities of monitored chunks are recorded in the combined monitoring record, and deleting, from the memory, the monitoring records that are combined, wherein a value of at least one monitoring parameter in the combined monitoring record is equal to a value of each monitoring parameter when all monitored chunks are viewed as one chunk; and write the combined monitoring record into the memory, wherein the combined monitoring record is used to monitor chunks monitored by each monitoring record before the combination.

11. The storage controller according to claim 10, after the writing the combined monitoring record into the memory, the processor is further configured to:

monitor an I/O request for a chunk in the storage; and update each monitoring parameter of the combined monitoring record in the memory according to the I/O request of the chunk, wherein the I/O request is monitored by the combined monitoring record.

12. The storage controller according to claim 11, wherein read, from the memory, monitoring records between which each monitoring parameter difference meets a corresponding preset threshold specifically comprises to:

read, from the memory, monitoring records between which a difference of IOPS value meets a preset IOPS threshold and a difference of IO times meets a preset JO times threshold.

13. The storage controller according to claim 12, wherein read, from the memory, monitoring records between which each monitoring parameter difference meets a corresponding preset threshold specifically comprises to:

read, from the memory, monitoring records between which a difference of IOPS value meets a preset IOPS threshold and a difference of IO times meets a preset IO times threshold.

14. The storage controller according to claim 13, after the step of write the combined monitoring record into the memory, the processor is further configured to:

read the combined monitoring record from the memory, and splitting the combined monitoring record into at least two split monitoring records, wherein each split monitoring record is used to monitor at least one chunk, and a sum of values of monitoring parameters in the split monitoring records is equal to a value of a monitoring parameter in the combined monitoring record; and delete the read combined monitoring record from the memory, and writing each split monitoring record into the memory.

15. The storage controller according to claim 14, after the step of write the combined monitoring record into the memory, the processor is further configured to:

read the combined monitoring record from the memory, and splitting the combined monitoring record into at least two split monitoring records, wherein each split monitoring record is used to monitor at least one chunk, and a sum of values of monitoring parameters in the split monitoring records is equal to a value of a monitoring parameter in the combined monitoring record; and delete the read combined monitoring record from the memory, and writing each split monitoring record into the memory.

16. A storage controller, comprising a processor, a communication interface communicating with the processor, and a memory communicating with the processor, wherein the communication interface is configured to communicate with a storage;

the memory is configured to store multiple monitoring records, wherein each monitoring record is used to monitor at least one chunk in the storage, and each monitoring record is a set of monitoring parameters of a monitored chunk; and the processor is configured to perform a program, wherein the program is used to:

read at least one monitoring parameter from each monitoring record in the memory;

split a monitoring record of which each value of the monitoring parameter meets a preset threshold, and generating at least two monitoring records after the split, wherein an offset address and a data length of data are carried in each split monitoring record, a sum of values of monitoring parameters in the split monitoring record is equal to a value of a monitoring parameter of a same type in a combined monitoring record; and write the split monitoring records into the memory, wherein the split monitoring records are used to monitor data described by the offset address and the data length that are carried in the split monitoring record.

17. The storage controller according to claim 16, wherein a value of each monitoring parameter in each split monitoring record specifically is:

a value obtained by apportioning a value of each monitoring parameter in the monitoring record before the splitting into each split monitoring record according to a data length carried in each split monitoring record.

18. The storage controller according to claim 17, wherein the monitoring parameter is a proportion of a number of random IOs to a total number of IOs.

* * * * *